US012744645B2

(12) United States Patent
Zhang et al.

(10) Patent No.: US 12,744,645 B2
(45) Date of Patent: Sep. 22, 2026

(54) METHOD FOR PDCCH BUFFER MANAGEMENT

(71) Applicant: Apple Inc., Cupertino, CA (US)

(72) Inventors: Yushu Zhang, Beijing (CN); Haitong Sun, Cupertino, CA (US); Wei Zeng, Saratoga, CA (US); Hong He, San Jose, CA (US); Chunhai Yao, Beijing (CN); Chunxuan Ye, San Diego, CA (US); Seyed Ali Akbar Fakoorian, San Diego, CA (US); Sigen Ye, San Diego, CA (US); Dawei Zhang, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/913,773

(22) PCT Filed: Sep. 24, 2021

(86) PCT No.: PCT/CN2021/120312

§ 371 (c)(1),
(2) Date: Sep. 22, 2022

(87) PCT Pub. No.: WO2023/044751

PCT Pub. Date: Mar. 30, 2023

(65) Prior Publication Data

US 2024/0356705 A1 Oct. 24, 2024

(51) Int. Cl.
*H04L 5/00* (2006.01)
*H04W 72/23* (2023.01)

(52) U.S. Cl.
CPC ........... *H04L 5/0053* (2013.01); *H04W 72/23* (2023.01)

(58) Field of Classification Search
None
See application file for complete search history.

(56) References Cited

U.S. PATENT DOCUMENTS 10,524,244 B2 12/2019 Tsai et al.
2016/0295558 A1 10/2016 Hussain et al.
(Continued)

FOREIGN PATENT DOCUMENTS

CN 109155931 A 1/2019
CN 109588057 A 4/2019
(Continued)

OTHER PUBLICATIONS

R1-2007764, 3GPP TSG RAN WG1 Meeting #103-e, e-Meeting, Oct. 26-Nov. 13, 2020 (Year: 2020).*
(Continued)

*Primary Examiner* — Ayaz R Sheikh
*Assistant Examiner* — Christopher R Davis
(74) *Attorney, Agent, or Firm* — Sterne, Kessler, Goldstein & Fox P.L.L.C.

(57) ABSTRACT

Approaches are described that enhance the reliability of physical downlink control channel (PDCCH) detection where the PDCCH can be transmitted repeatedly with different beams. The approaches use soft combining where the user equipment (UE) combines the soft bits from each repetition, with the combined soft bits used to jointly decode the PDCCH repetitions. To support the soft combining, the UE needs to buffer the soft bits. Buffering approaches include determining what contributes towards the buffering, including scenarios where one of the linked search sets (SSs) is dropped, what is contributed in a linked SS set pair, how the duration of buffer counting is determined, and how the UE reports its maximum buffer size capability. In scenarios where the required buffer size exceeds the UE maximum buffer size, a priority rule may be used in the PDCCH decoding using the SS sets pair, where the priority is based on the SS type, the serving cell index, the SS set ID and/or the control channel resource set (CORESET) ID.

20 Claims, 8 Drawing Sheets

(56) References Cited

U.S. PATENT DOCUMENTS

| | | | | |
|---|---|---|---|---|
| 2018/0192405 | A1 | 7/2018 | Gong et al. | |
| 2019/0029009 | A1 | 1/2019 | Freda et al. | |
| 2021/0195601 | A1 | 6/2021 | Khoshnevisan et al. | |
| 2022/0007395 | A1* | 1/2022 | Lei | H04L 1/0003 |
| 2022/0094467 | A1* | 3/2022 | Khoshnevisan | H04W 72/23 |
| 2022/0225301 | A1* | 7/2022 | Khoshnevisan | H04L 5/0094 |
| 2022/0240111 | A1* | 7/2022 | Jang | H04W 72/23 |
| 2023/0058592 | A1* | 2/2023 | Venugopal | H04B 7/0695 |
| 2023/0141339 | A1* | 5/2023 | Kittichokechai | H04W 24/08 370/329 |
| 2024/0064762 | A1* | 2/2024 | Sun | H04L 1/0038 |

FOREIGN PATENT DOCUMENTS

| | | | |
|---|---|---|---|
| EP | 4084388 | A2 | 11/2022 |
| WO | 2020064512 | A1 | 4/2020 |
| WO | 2022151245 | A1 | 7/2022 |

OTHER PUBLICATIONS

3GPP TSG-RAN WG1 Meeting #104-e R1-210xxxx, e-Meeting, Jan. 25-Feb. 5, 2021, Agenda Item 8.1.2.1, Discussion Summary for mTRP PDCCH Reliability Enhancements (Year: 2021).*

International Search Report and Written Opinion for International Application No. PCT/CN2021/120312, Chinese National Intellectual Property Administration, China, mailed Jun. 23, 2022, 9 pages.

3GPP TS 38.306; 3rd Generation Partnership Project; Technical Specification Group Radio Access Network; NR; User Equipment (UE) radio access capabilities (Release 16) V16.5.0; 153 pages; Jun. 2021.

Huawei, HiSilico, “Enhancements on multi-TRP for reliability and robustness in Re1-17,” 3GPP TSG RAN WG1 Meeting #104bis-e, E-meeting, Apr. 12-20, 2021, R1-2102334; 15 pages.

Vivo, “Further discussion on Multi-TRP for PDCCH, PUCCH and PUSCH enhancements,” 3GPP TSG RAN WG1 #106-e, e-Meeting, Aug. 16-27, 2021, R1-2106572; 28 pages.

* cited by examiner

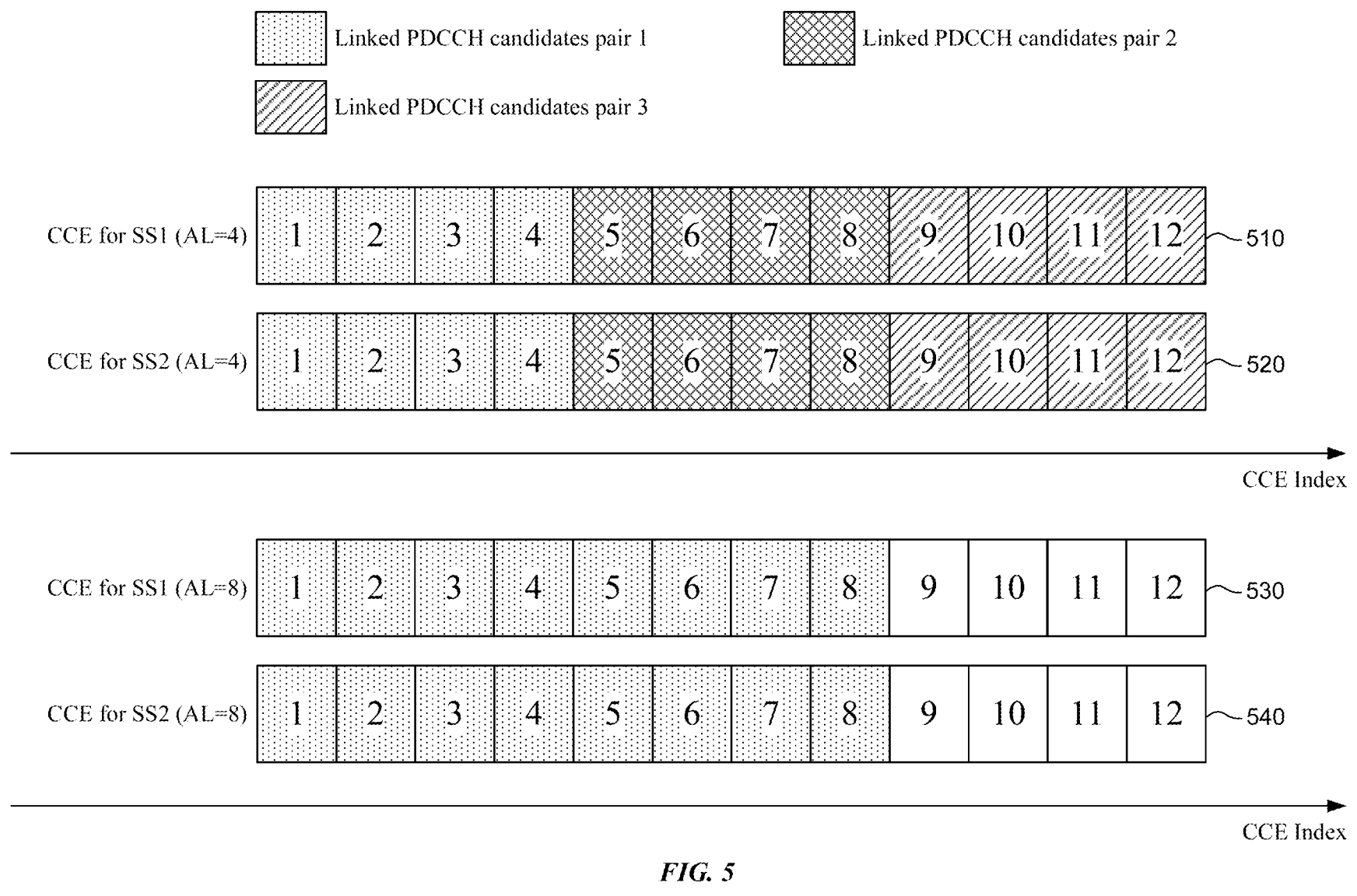

Linked PDCCH candidates pair 1
Linked PDCCH candidates pair 2
Linked PDCCH candidates pair 3

CCE for SS1 (AL=4) 1 2 3 4 5 6 7 8 9 10 11 12 510
CCE for SS2 (AL=4) 1 2 3 4 5 6 7 8 9 10 11 12 520
CCE Index CCE for SS1 (AL=8) 1 2 3 4 5 6 7 8 9 10 11 12 530
CCE for SS2 (AL=8) 1 2 3 4 5 6 7 8 9 10 11 12 540
CCE Index

*FIG. 5*

METHOD FOR PDCCH BUFFER MANAGEMENT

BACKGROUND

Field

Various aspects generally may relate to the field of wireless communications.

SUMMARY

Aspects of the approach described herein include a user equipment (UE). The UE includes a radio frequency (RF) receiver configured to receive a first physical downlink control channel (PDCCH) signal and a second PDCCH signal from a base station, the second PDCCH signal being a repetition of the first PDCCH signal and sent via a different beam from the base station than that of the first PDCCH signal, the first PDCCH signal and the second PDCCH signal sharing a same control channel element (CCE) aggregation level and a starting candidate index, the first PDCCH signal and the second PDCCH signal configured by the base station to use two linked search space (SS) sets. The UE further includes processing circuitry coupled to the RF receiver, the processing circuitry configured to blindly decode the first PDCCH signal and the second PDCCH signal by obtaining respective soft-bits from the first PDCCH signal and the second PDCCH signal. The UE also includes a buffer coupled to the processing circuitry and configured to buffer the respective soft-bits for a duration. Further, the processing circuitry is configured to combine respective soft-bits to jointly decode the first PDCCH signal and the second PDCCH signal.

Aspects of the approach also include a method that includes the step of receiving, by a user equipment (UE), a first physical downlink control channel (PDCCH) signal and a second PDCCH signal from a base station, the second PDCCH signal being a repetition of the first PDCCH signal and sent via a different beam from the base station than that of the first PDCCH signal, the first PDCCH signal and the second PDCCH signal sharing a same control channel element (CCE) aggregation level and a starting candidate index, the first PDCCH signal and the second PDCCH signal configured by the base station to use two linked search space (SS) sets. The method also includes the step of blindly decoding the first PDCCH signal and the second PDCCH signal by obtaining respective soft-bits from the first PDCCH signal and the second PDCCH signal. In addition, the method includes the step of buffering, by a buffer, the respective soft-bits for a duration. The method also includes the step of combining the respective soft-bits to jointly decode the first PDCCH signal and the second PDCCH signal.

Aspects of the approach described herein include a base station. The base station includes a radio frequency (RF) transceiver configured to receive an indication of a maximum supported buffer size of a user equipment (UE). The base station further includes processing circuitry, coupled to the RF transceiver, configured to generate a first physical downlink control channel (PDCCH) signal and a second PDCCH signal, the second PDCCH signal being a repetition of the first PDCCH signal, the first PDCCH signal and the second PDCCH signal sharing a same control channel element (CCE) aggregation level and a starting candidate index, the first PDCCH signal and the second PDCCH signal configured to use two linked search space (SS) sets. The processing circuitry in the base station is further configured to adjust scheduling of the first PDCCH signal or the second PDCCH signal, or to adjust priorities of the two linked SS sets based on the indication of maximum supported buffer size. The RF transceiver of the base station is further configured to transmit the first physical downlink control channel (PDCCH) signal and a second PDCCH signal to the UE.

Aspects of the approach also include a method that includes the step of receiving, by a base station, an indication of a maximum supported buffer size of a user equipment (UE). The method also includes the step of generating a first physical downlink control channel (PDCCH) signal and a second PDCCH signal, the second PDCCH signal being a repetition of the first PDCCH signal, the first PDCCH signal and the second PDCCH signal sharing a same control channel element (CCE) aggregation level and a starting candidate index, the first PDCCH signal and the second PDCCH signal configured to use two linked search space (SS) sets. The method also includes the step of adjusting scheduling of the first PDCCH signal or the second PDCCH signal, or adjusting priorities of the two linked SS sets based on the indication of maximum supported buffer size. The method also includes the step of transmitting the first physical downlink control channel (PDCCH) signal and a second PDCCH signal to the UE.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

The accompanying drawings, which are incorporated herein and form part of the specification, illustrate the present disclosure and, together with the description, further serve to explain the principles of the disclosure and enable a person of skill in the relevant art(s) to make and use the disclosure.

FIG. 5 illustrates two linked SS sets that support aggregation levels of 4 and 8, in accordance with aspects of the disclosure.

Figure 1:
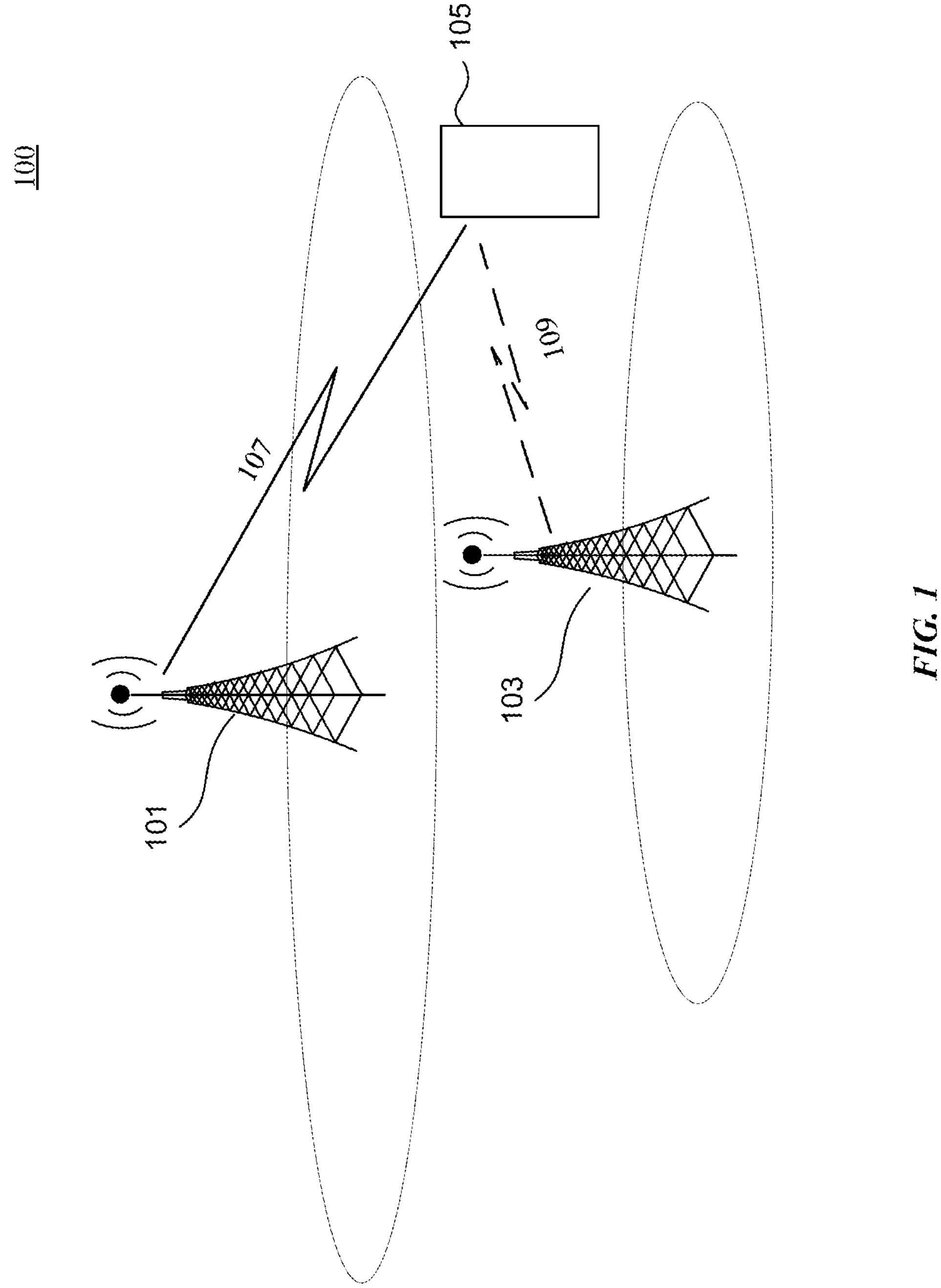
FIG. 1 illustrates an example system implementing mechanisms for buffering soft-bits for blind PDCCH decoding, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

FIG. 1 illustrates an example system implementing mechanisms for buffering soft-bits for blind PDCCH decoding, according to some aspects of the disclosure. Example system 100 is provided for the purpose of illustration only and does not limit the disclosed aspects. System 100 may include, but is not limited to, network nodes (for example, base stations such as eNBs) 101 and 103 and electronic device (for example, a UE) 105. Electronic device 105 (hereinafter referred to as UE 105) can be configured to operate based on a wide variety of wireless communication techniques. These techniques can include, but are not limited to, techniques based on 3rd Generation Partnership Project (3GPP) standards. For example, UE 105 can be configured to operate using the 3GPP standards. UE 105 can include, but is not limited to: a wireless communication device, a smart phone, a laptop, a desktop, a tablet, a personal assistant, a monitors, a television, a wearable device, Internet of Things (IoTs), a vehicle's communication device, and the like. Network node 101 (herein referred to as a base station) can include nodes configured to operate based on a wide variety of wireless communication techniques such as, but not limited to, techniques based on 3GPP standards.

According to some aspects, UE 105 and base stations 101 and 103 are configured to implement mechanisms for UE 105 for buffering soft-bits for blind PDCCH decoding. In some aspects, UE 105 is configured to for buffering soft-bits for blind PDCCH decoding. According to some aspects, UE 105 can be connected to and can be communicating with base station 101 (e.g., the serving cell) using carrier 107 from which UE 105 buffers soft-bits for blind PDCCH decoding.

According to some aspects, UE 105 can measure one or more carriers (e.g., carrier 107) used for communication with base station 101 (e.g., the serving cell) to perform buffering soft-bits for blind PDCCH decoding.

Figure 2:
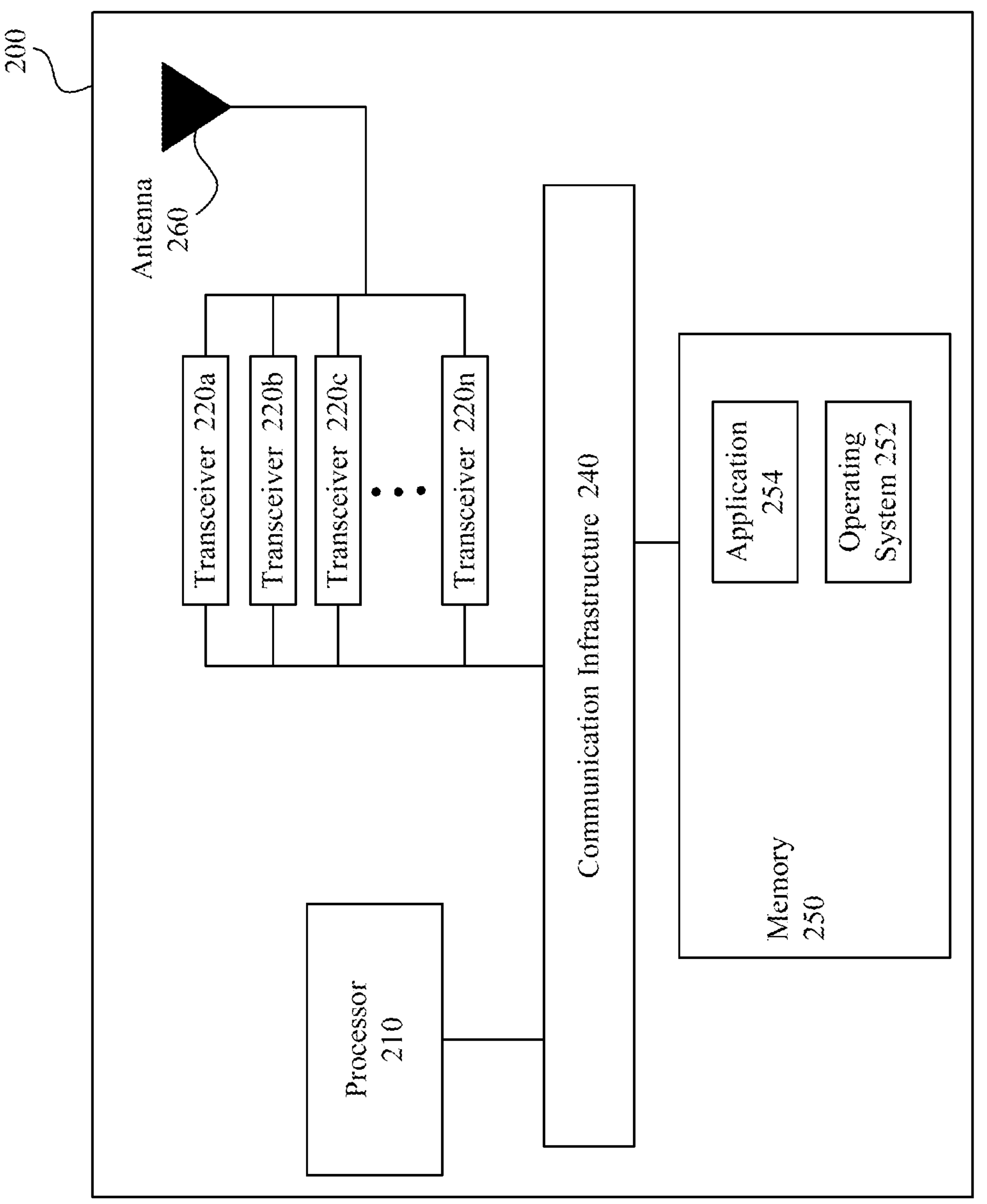
FIG. 2 illustrates a block diagram of an example system 200 of an electronic device implementing buffering soft-bits for blind PDCCH decoding, according to some aspects of the disclosure.

FIG. 2 illustrates a block diagram of an example system 200 of an electronic device implementing buffering soft-bits for blind PDCCH decoding, according to some aspects of the disclosure. System 200 may be any of the electronic devices (e.g., base station 101, UE 105) of system 100. System 200 includes processor 210, one or more transceivers 220*a*-220*n*, communication infrastructure 240, memory 250, operating system 252, application 254, and antenna 260. Illustrated systems are provided as exemplary parts of system 200, and system 200 can include other circuit(s) and subsystem(s). Also, although the systems of system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. In various embodiments, a buffer (a temporary data storage area) may be a portion of memory 250. According to some examples, operating system 252 can be stored in memory 250. Operating system 252 can manage transfer of data from memory 250 and/or one or more applications 254 to processor 210 and/or one or more transceivers 220*a*-220*n*. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, radio streaming, video streaming, remote control, and/or other user applications.

System 200 can also include communication infrastructure 240. Communication infrastructure 240 provides communication between, for example, processor 210, one or more transceivers 220*a*-220*n*, and memory 250. In some implementations, communication infrastructure 240 may be a bus.

Processor 210 together with instructions stored in memory 250 performs operations enabling system 200 of system 100 to implement mechanisms for performing buffering soft-bits for blind PDCCH decoding, as described herein.

One or more transceivers 220*a*-220*n* transmit and receive communications signals that support mechanisms for performing buffering soft-bits for blind PDCCH decoding, according to some aspects, and may be coupled to antenna 260. Antenna 260 may include one or more antennas that may be the same or different types. One or more transceivers 220*a*-220*n* allow system 200 to communicate with other devices that may be wired and/or wireless. In some examples, one or more transceivers 220*a*-220*n* can include processors, controllers, radios, sockets, plugs, buffers, and like circuits/devices used for connecting to and communication on networks. According to some examples, one or more transceivers 220*a*-220*n* include one or more circuits to connect to and communicate on wired and/or wireless networks.

According to some aspects, one or more transceivers 220*a*-220*n* can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 220*a*-220*n* can include more or fewer systems for communicating with other devices.

In some examples, one or more transceivers 220*a*-220*n* can include one or more circuits (including a WLAN transceiver) to enable connection(s) and communication over WLAN networks such as, but not limited to, networks based on standards described in IEEE 802.11. Additionally, or alternatively, one or more transceivers 220*a*-220*n* can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 220*n* can include a Bluetooth™ transceiver.

Additionally, one or more transceivers 220*a*-220*n* can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 220*a*-220*n* can be configured to operate according to one or more of Rel-15, Rel-16, Rel-17, or other of the 3GPP standard.

According to some aspects, processor 210, alone or in combination with computer instructions stored within memory 250, and/or one or more transceiver 220*a*-220*n*, implements buffering soft-bits for blind PDCCH decoding, as discussed herein. For example, transceiver 220*a* can enable connection(s) and communication over a first carrier (for example, carrier 107 of FIG. 1). In this example, transceiver 220*a* and/or transceiver 220*b* can enable buffering soft-bits for blind PDCCH decoding (for example, carrier 109 of FIG. 1). Additionally, or alternatively, wireless system 200 can include one transceiver configured to operate at different carriers. Processor 210 can be configured to control the one transceiver to switch between different carriers, according to some examples. Although the operations discussed herein are discussed with respect to processor 210, it is noted that processor 210, alone or in combination with computer instructions stored within memory 250, and/or one or more transceiver 220*a*-220*n*, can implement these operations.

Overview of PDCCH Decoding in Wireless Communications System

The physical downlink control channel (PDCCH) is the control channel that carries the control signals to support mobile wireless communication system. In describing the wireless resources being used in the mobile wireless communication system, the resource element (RE) is the smallest unit of the time-frequency grid, and consists of one subcarrier in the frequency domain and one OFDM symbol in the time domain. A resource element group (REG) is one resource block, where one resource block contains 12 REs in the frequency domain and one OFDM symbol in the time domain. An REG Bundle is made up of multiple REGs, where the bundle size is indicated by the parameter "L" that is provided via the RRC signal. A control channel element (CCE) is a combination of multiple REGs, where the number of REGs in a CCE varies. Finally, an aggregation level (AL) indicates the number of CCEs allocated for a PDCCH, and is pre-defined, as shown in Table 1 below.

Returning to the PDCCH, the user equipment (UE) or mobile device is initially unaware of precisely where the PDCCH is being carried in the time-frequency grid. Thus, at a high level, the UE or mobile device is faced with blindly decoding candidate PDCCHs that are transmitted from the network. In this blind decoding, the UE is aware of a range that potentially carries the PDCCH. Within this range, the UE tries to decode the PDCCH using numerous values of parameters in a trial and error approach.

In Release 15 of the 3GPP Technical Specifications, the UE can decode the PDCCH based on the configuration of search space (SS) and control channel resource set (CORESET). Because there are multiple aggregation levels, a device can have multiple search spaces in which to decoding attempts are made. In particular, there can be multiple search spaces using the same CORESET. The details of the SS and CORESET are configured by RRC signaling. The SS information provides a slot and start symbol index by the two parameters: monitoringSlotPeriodicityAndOffset and monitoringSymbolsWithinSlot. Similarly, the CORESET information provides the frequency resource, symbol duration as well as the transmission and configuration indication (TCI) by the three parameters: frequencyDomainResources, duration and tci-StatesPDCCH-ToAddList tci-StatesPDCCH-ToReleaseList. The TCI indicates the beam related information, which can be also be updated by MAC control element (CE).

Figure 3:
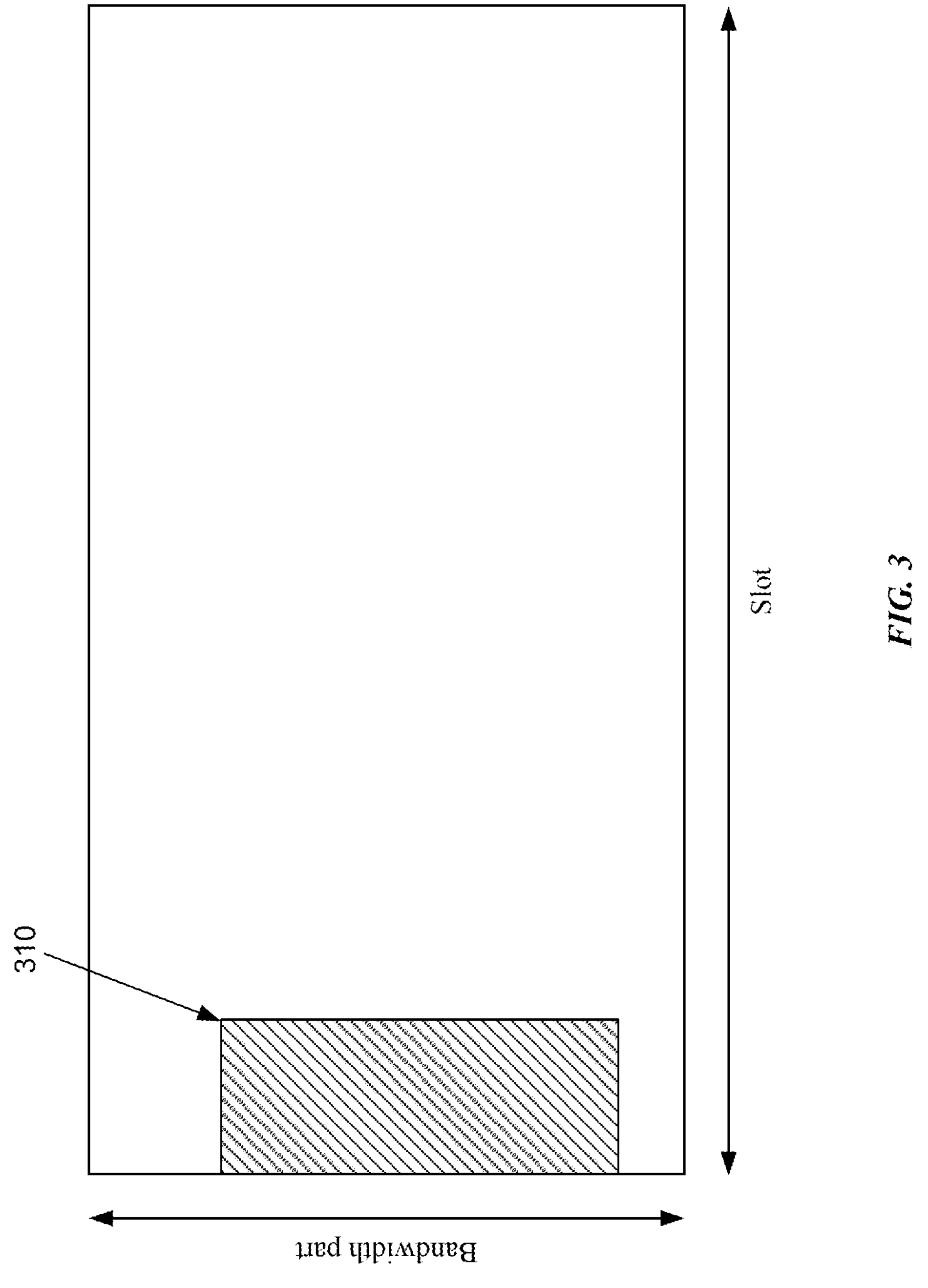
FIG. 3 illustrates a possible PDCCH location 310 on a time-frequency grid, with the slot shown on the time domain axis, and bandwidth part on the frequency axis, in accordance with aspects of the disclosure.

FIG. 3 illustrates a possible PDCCH location 310 on a time-frequency grid, with the slot shown on the time domain axis, and bandwidth part on the frequency axis, in accordance with aspects of the disclosure. As noted above, the possible PDCCH location 310 is identified by the UE based on a SS and its associated CORESET. The frequency location, the number of symbols, and the TCI state of PDCCH location 310 is configured by CORESET, the number of symbols of PDCCH location 310 is configured by CORESET. The slot and starting symbol index is configured by the SS.

In addition to the time-frequency grid location, the UE should detect the Control Channel Element (CCE) location for a PDCCH candidate within the configured time/frequency resources. For PDCCH to schedule SIB1, the candidate CCE aggregation and number of CCEs are predefined as shown below in Table 1:

TABLE 1

| CCE Aggregation Level | Number of Candidates |
|---|---|
| 4 | 4 |
| 8 | 2 |
| 16 | 1 |

For other types of PDCCHs, the candidate CCE aggregation level is configured by the parameter: nrofCandidates.

For each PDCCH candidate m_(s,n_CI), the possible CCEs are can be calculated as follows and the interpretation of each variable is defined in section 10.1 of 3GPP Technical Specification TS 38.214:

$$L\cdot\left\{\left(Y_{p,n^{\mu}_{s,f}}+\left\lfloor\frac{m_{s,n_{CI}}\cdot N_{CCE,p}}{L\cdot M^{(L)}_{s,max}}\right\rfloor+n_{CI}\right)\bmod\lfloor N_{CCE,p}/L\rfloor\right\}+i$$

In summary, in Release 15, the process is for the UE has to blindly attempt to decode the CCEs with different CCE aggregation levels, until it decodes the PDCCH correctly.

Turning now to Release 17 of the 3GPP Technical Specifications, and in order to improve PDCCH reliability, PDCCH can be transmitted repeatedly with different beams. In this Release, the base station (e.g., gNB) can configure two linked SS sets and the two SS sets can be associated with different CORESETs. Note that in the linked SS sets, the linked PDCCH candidates (PDCCH repetition) should share the same CCE aggregation level and starting candidate index. In this scenario, there can be two detection schemes: a repetition scheme and a soft combining scheme.

In the first detection scheme, the repetition scheme, the UE detects each repetition independently, and the PDCCH can be considered as "detected" if one of them is decoded successfully.

Figure 4:
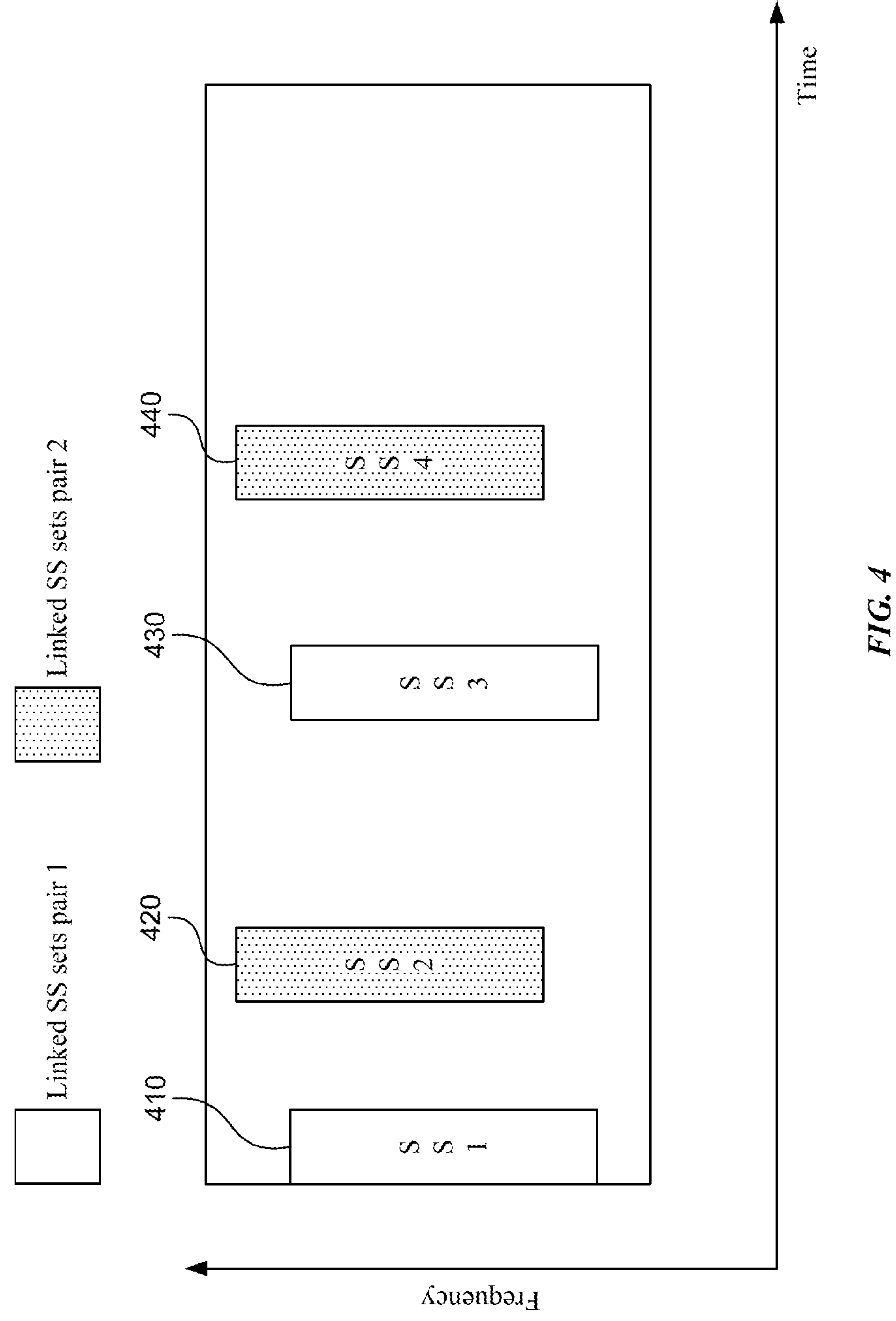
FIG. 4 illustrates two linked SS set pairs, in accordance with some aspects of the disclosure.

In the second detection scheme, the soft combining scheme, the UE combines the soft-bits obtained from each repetition and uses the combined soft-bits for channel decoding to jointly decode the PDCCH repetitions. Thus, in this scheme, this would require UE to buffer the soft-bits for the linked candidates. However, in the soft combining scheme, the UE needs to buffer the soft-bits in order to support the soft combining. This is turn poses a challenge—the UE memory (e.g., memory 250, of which the buffer may be a portion thereof) may be limited, such that the UE is not able to buffer a lot of soft-bits. For example, as illustrated in FIG. 4 on a time-frequency grid, the UE needs to buffer soft-bits to decode all the linked PDCCH candidates in the linked SS sets pair. FIG. 4 illustrates two linked SS set pairs: SS1 (410) and SS3 (430), and SS2 (420) and SS4 (440), in accordance with some aspects of the disclosure.

In addition to the challenge noted above, the following aspects also need to be address when managing the soft-bits buffer for PDCCH during PDCCH repetition detection: (a) UE configured in carrier aggregation (CA) operation with multiple component carriers (CC); (b) dropping of one of the linked SS set due to overbooking, QCL-TypeD collision handling, overlapping with SSB, overlapping with rate matching resources, overlapping with semi-static/dynamic UL symbols or PRACH; (c) difference UE receiving schemes; and (d) occupied duration for a buffer. Each of these will be dealt with below.

Regarding the CA operation, the following options may be provided in support of the buffer supporting the soft-bit combining approach. In Option 1, the buffer is incremented (or counted) on a per component carrier (CC) or bandwidth part (BWP). In this disclosure, the terms “incrementing” or “counting” refer to whether contributions are included in the buffer (i.e., are taken into account) for the soft decoding process. In Option 2, the buffer is incremented across CCs in a band. In a third option, Option 3, the buffer is incremented across CCs in a band combination. In a fourth option, Option 4, the buffer is incremented across CCs in a frequency range (FR). In a fifth option, Option 5, the buffer is incremented on a per UE basis. In the final option, Option 6, the UE can report how to increment the buffer in CA operation as a per UE capability.

If UE is capable of supporting multiple options from Option 1 through Option 5, an RRC parameter can be introduced to select one option of these available options.

With regard to the more sophisticated multi downlink control information (multi-DCI)-based multi transmission/reception point (multi-TRP) operation, the following options may be provided in support of the soft-bit combining approach. In the first option, Option 1, the buffer is incremented on a per TRP-CORESETs associated with the same CORESETPoolIndex parameter. In the second option, Option 2, the buffer is incremented across TRPs. In the third option, Option 3, whether the buffer is incremented on a per TRP or across TRPs can be reported as UE capability. Note that if the UE supports multiple options from Option 1 through Option 2, an RRC parameter can be introduced to select one option.

Regarding the scenario where one of the linked SS set is dropped, the following options are provided to address this situation. In the first option, Option 1, the buffer for the linked SS sets is still incremented. In the second option, Option 2, the buffer for the linked SS sets is not incremented. In the third option, Option 3, whether the buffer is incremented or not depends on a predefined rule, e.g., whether the dropped linked SS is still counted for blind detection (BD) or the reason for the dropping, e.g., overbooking, QCL-TypeD collision handling, overlapping with SSB, overlapping with rate matching resources, overlapping with semi-static/dynamic UL symbols or PRACH. In the fourth option, Option 4, whether the buffer is incremented or not depends on whether the dropped linked SS is reported by UE capability or configured by higher layer signaling.

For buffer counting for a linked SS sets pair, the following options are provided. In the first option, Option 1, the buffer receives contributions from, or counts, all the linked PDCCH candidates. In the second option, Option 2, the buffer counts the maximum total number of REs for each CCE aggregation level. In the third option, Option 3, whether to use option 1 or option 2 is reported by UE capability or configured by higher layer signaling.

FIG. 5 illustrates two linked SS sets that support aggregation levels of 4 and 8, i.e., AL={4, 8}, in accordance with aspects of the disclosure. In the first illustrated option, Option 1, the buffer counts the soft-bits to decode PDCCH candidate pair 1, 2 and 3 for Aggregation Level (AL)=4 (search sets SS1 (510) and SS2 (520)), as well as PDCCH candidate pair 1 for AL=8 (search sets SS1 (530) and SS2 (540)). This assumes that the UE uses parallel decoding for each PDCCH candidates pair.

For option 2, the buffer counts the soft-bits to decode PDCCH in CCE 1-12 only. This assumes the soft-bits can be shared for PDCCH candidates with overlapped CCEs.

Figure 6:
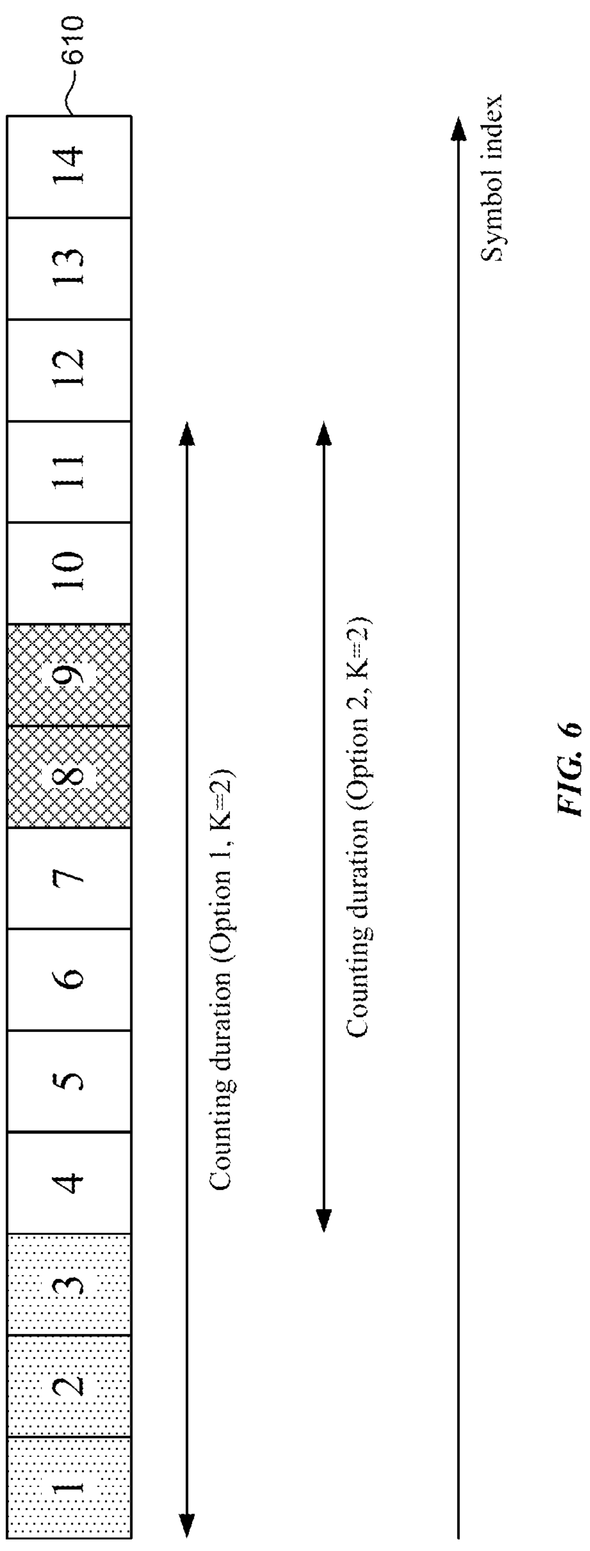
FIG. 6 illustrates the duration for a linked SS sets pair, according to some aspects of this disclosure.

For duration of buffer counting for a linked SS sets pair, the following options are provided. In the first option, Option 1, the duration starts from the first symbol of the SS set that starts earlier and stops after K symbols after the last symbol of the SS set that ends later. In the second option, Option 2, the duration starts from the last symbol of the SS set that ends earlier and stops after K symbols after the last symbol of the SS set that ends later. The parameter K may be predefined or reported by UE capability or configured by higher layer signaling, e.g., RRC signaling. FIG. 6 illustrates these two options, in accordance with aspects of the disclosure. The sequence of symbols (610) shows two durations. In Option 1, and with K equal to 2, the duration begins at symbol 1, and finishes at symbol index 11, two symbols after the last symbol of the SS set that ends earlier. In Option 2, and with K equal to 2, the duration begins at symbol 4 (after the last symbol of the SS set that ends earlier), and finishes at symbol index 11, two symbols after the last symbol of the SS set that ends earlier.

In addition to the buffer counting (or incrementing) rule described above, the UE may report the maximum buffer size it can support as a UE capability. If the UE does not support soft combining, it does not report this UE capability. Alternatively, the maximum buffer size can be predefined and the UE only needs to report whether it supports soft combining or not. Whether the UE supports soft combining or not may be reported by a separate UE capability or determined by a BD counting rule. For example, if the UE reports BD=2, it does not support soft combining; if the UE reports BD=3, it supports soft combining. Alternatively, the maximum number of linked SS sets pairs overlapped in time domain can be predefined or reported by UE capability. The duration for a linked SS sets pair is counted based on options described above, and illustrated in FIG. 6.

The following options are provided after the maximum buffer size is determined. In the first option, Option 1, gNB scheduling should avoid the case requiring buffer size exceed the maximum buffer size. In the second option, Option 2, there is no restriction for scheduling, and UE can change the PDCCH receiving schemes. If the required buffer size exceed the maximum buffer size, a priority rule can be introduced for the SS sets pair, which is determined by SS type, serving cell index, SS set ID and/or CORESET ID. In one example, the priority can be determined by SS type (CSS>USS), then serving cell index and then associated SS set or CORESET ID (lowest ID>highest ID).

For low priority SS sets pair(s), there are at least three options. In the first option, Option 1, UE drops these pairs to meet the buffer size requirement. In the second option, Option 2, UE applies selective decoding to receive these pairs to meet the buffer size requirement. In the third option, Option 3, whether to use option 1 or 2 can be reported by UE capability or configured by the base station (e.g., gNB). The interpretation of the decoded DCI and BD counting may be based on assumption of single PDCCH or multi-PDCCH repetition. As an extension, option 1/2/3 may only be applied for some linked PDCCH candidates from the low priority SS sets pair(s), and the priority for the linked PDCCH candidates are determined by the candidate index and AL. In one example, priority is counted based on AL first (larger AL<lower AL), then candidate index (low>high).

Figure 7:
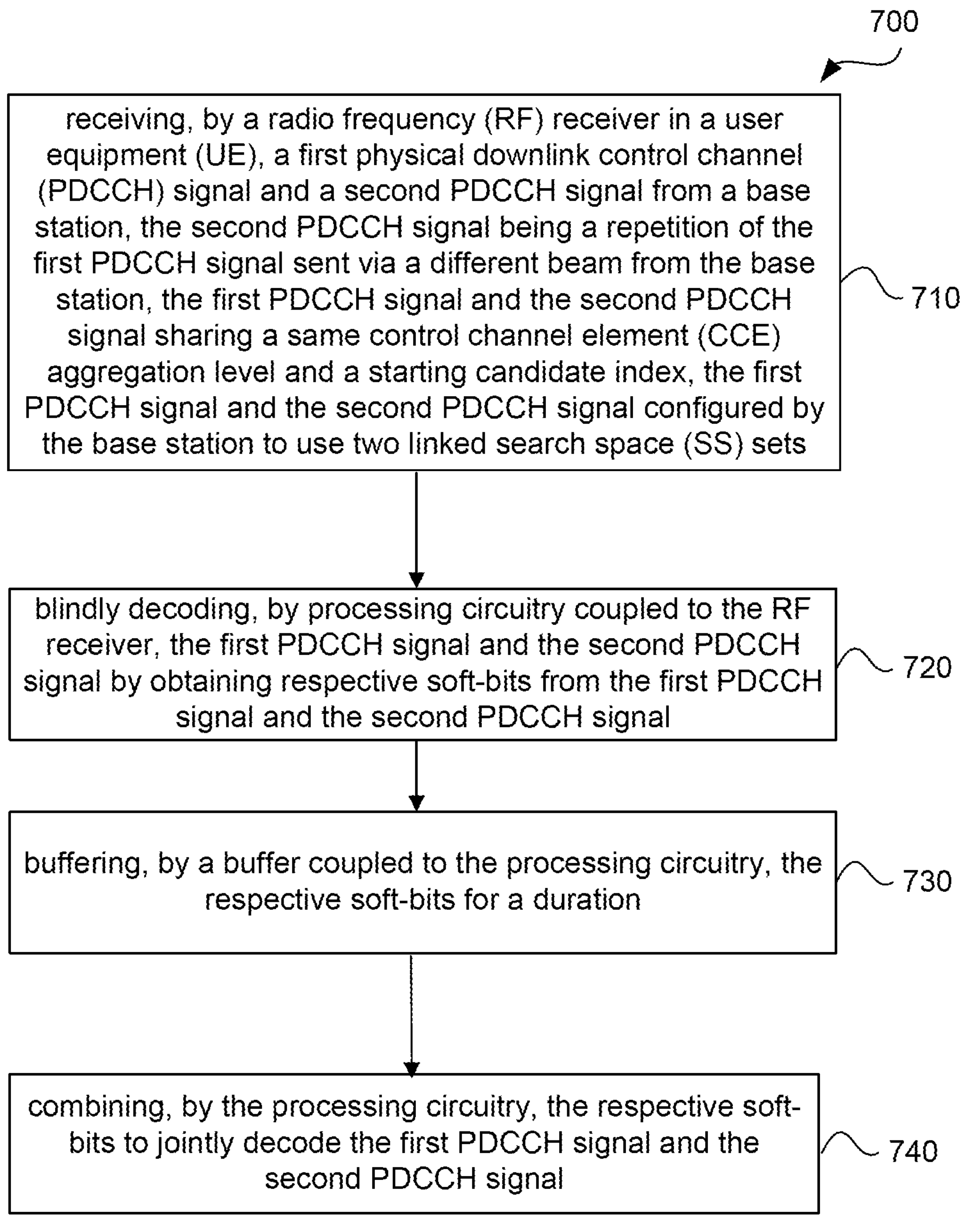
FIG. 7 illustrates a flowchart diagram of a method 700 for buffering soft-bits for blind PDCCH decoding, in accordance with aspects of the present disclosure.

FIG. 7 illustrates a flowchart diagram of a method 700 for buffering soft-bits for blind PDCCH decoding, in accordance with aspects of the present disclosure. Step 710 includes receiving, by a radio frequency (RF) receiver in a user equipment (UE), a first physical downlink control channel (PDCCH) signal and a second PDCCH signal from a base station, the second PDCCH signal being a repetition of the first PDCCH signal and sent via a different beam from the base station than that of the first PDCCH signal, the first PDCCH signal and the second PDCCH signal sharing a same control channel element (CCE) aggregation level and a starting candidate index, the first PDCCH signal and the second PDCCH signal configured by the base station to use two linked search space (SS) sets. In other words, the first PDCCH signal is sent via a first beam from the base station and the second PDCCH signal is sent via a second beam from the base station.

Step 720 includes blindly decoding, by processing circuitry coupled to the RF receiver, the first PDCCH signal and the second PDCCH signal by obtaining respective soft-bits from the first PDCCH signal and the second PDCCH signal.

Step 730 includes buffering, by a buffer coupled to the processing circuitry, the respective soft-bits for a duration.

Finally, Step 740 includes combining, by the processing circuitry, the respective soft-bits to jointly decode the first PDCCH signal and the second PDCCH signal.

Figure 8:
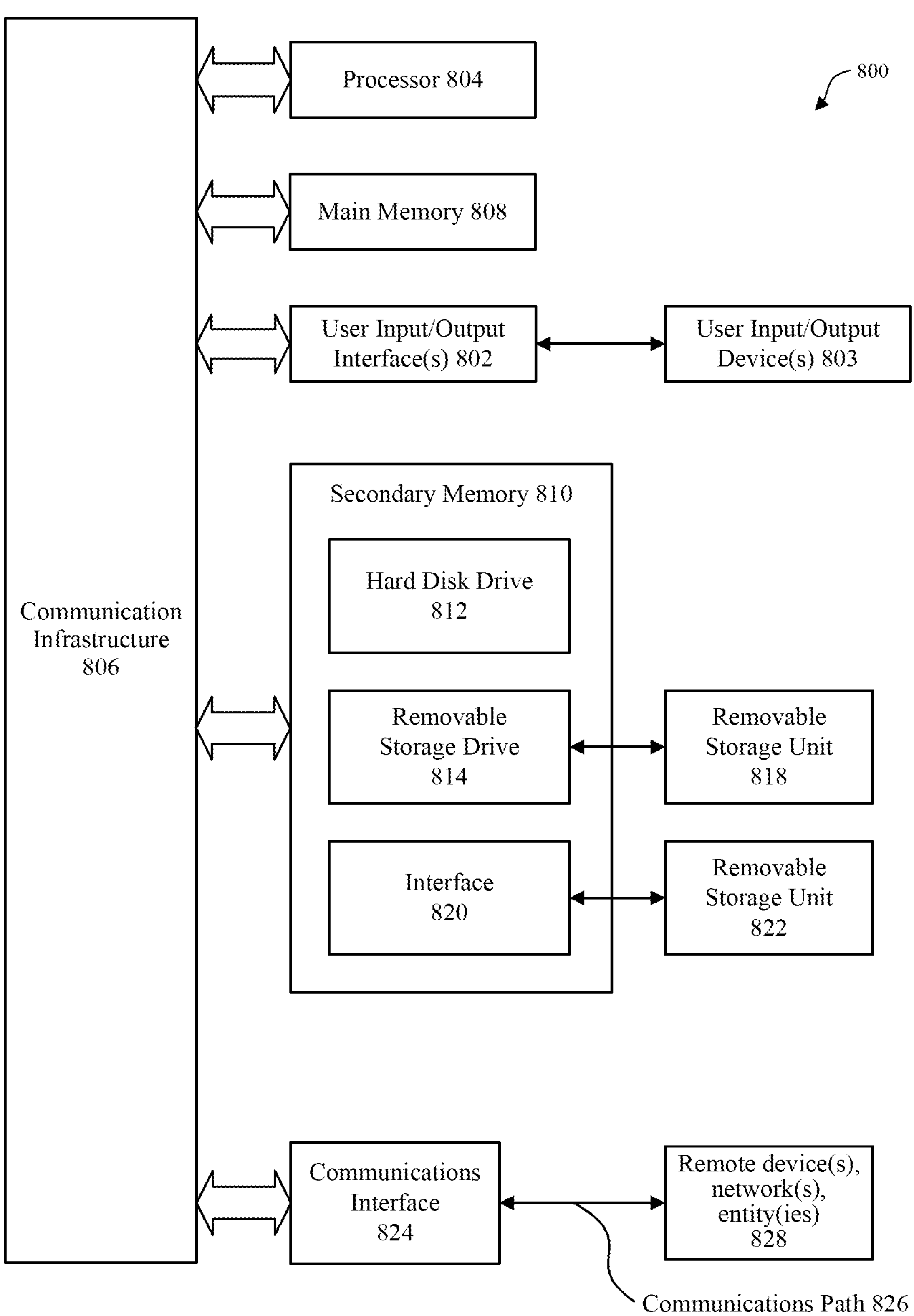
FIG. 8 is an example computer system for implementing some aspects or portion(s) thereof.

Various aspects can be implemented, for example, using one or more computer systems, such as computer system 800 shown in FIG. 8. Computer system 800 can be any well-known computer capable of performing the functions described herein such as devices 101, 103, 105 of FIG. 1, or 200 of FIG. 2. Computer system 800 includes one or more processors (also called central processing units, or CPUs), such as a processor 804. Processor 804 is connected to a communication infrastructure 806 (e.g., a bus.) Computer system 800 also includes user input/output device(s) 803, such as monitors, keyboards, pointing devices, etc., that communicate with communication infrastructure 806 through user input/output interface(s) 802. Computer system 800 also includes a main or primary memory 808, such as random access memory (RAM). Main memory 808 may include one or more levels of cache. Main memory 808 has stored therein control logic (e.g., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to some aspects, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and may include any combination of LANs, WANs, the Internet, etc. Control logic and/or data may be transmitted to and from computer system 800 via communication path 826.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 800, main memory 808, secondary memory 810 and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 8. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "an aspect," "an example aspect," or similar phrases, indicate that the aspect described may include a particular feature, structure, or characteristic, but every aspects may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. The breadth and scope of the disclosure should not be limited by any of the above-described exemplary aspects, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates aspects in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed aspects, the present disclosure also contemplates that the various aspects can also be implemented without the need for accessing such personal information data. That is, the various aspects of the present technology are not rendered inoperable due to the lack of all or a portion of such personal information data.

What is claimed is:

1. A user equipment (UE) comprising:

a radio frequency (RF) receiver configured to receive a first physical downlink control channel (PDCCH) signal and a second PDCCH signal from a base station, the second PDCCH signal being a repetition of the first PDCCH signal and sent via a different beam from the base station than that of the first PDCCH signal, the first PDCCH signal and the second PDCCH signal sharing a same control channel element (CCE) aggregation level and a starting candidate index, the first PDCCH signal and the second PDCCH signal configured by the base station to use two linked search space (SS) sets, wherein a maximum number of linked SS sets overlapping in a time domain are predefined or are determined based on reported UE capability;

processing circuitry coupled to the RF receiver, the processing circuitry configured to blindly decode the first PDCCH signal and the second PDCCH signal by obtaining respective soft-bits from the first PDCCH signal and the second PDCCH signal;

a buffer coupled to the processing circuitry and configured to buffer the respective soft-bits for a duration, wherein the buffer is incremented using one of per component carrier (CC), per bandwidth part (BWP), counted across CCs in a band, counted across CCs in a band combination, counted across CCs in a frequency range (FR), or counted per UE; and the processing circuitry further configured to combine the respective soft-bits to jointly decode the first PDCCH signal and the second PDCCH signal.

2. The UE of claim 1, wherein the one of per component carrier (CC), per bandwidth part (BWP), counted across CCs in a band, counted across CCs in a band combination, counted across CCs in a frequency range (FR), or counted per UE is selected based on an RRC parameter.

3. The UE of claim 1, wherein the UE is engaged in a multi-downlink control information (DCI)-based multi-transmission-reception-point (multi-TRP) operation, and the buffer is incremented on a per TRP-control channel resource set (CORESET) associated with a same CORESETPoolIndex, or is counted across TRPs.

4. The UE of claim 1, wherein one of the two linked SS sets is dropped due to one of overbooking, QCL-TypeD collision handling, overlapping of SSB, overlapping of rate matching resources, overlapping with semi-static/dynamic uplink (UL) symbols or a physical random access channel (PRACH).

5. The UE of claim 1, wherein the buffer is incremented based on all linked PDCCH candidates, or the buffer is incremented based on a maximum total number of resource elements (REs) for each CCE aggregation level.

6. The UE of claim 1, wherein the duration of the buffer starts from a first symbol of an earliest SS set, and stops after K symbols at a last symbol of a later-ending SS set.

7. The UE of claim 6, wherein K is predefined, is reported as a UE capability, or is configured by a higher layer signaling.

8. The UE of claim 1, wherein the duration of the buffer starts from a last symbol of an earliest SS set, and stops after K symbols at a last symbol of a later-ending SS set.

9. The UE of claim 8, wherein K is predefined, is reported as a UE capability, or is configured by a higher layer signaling.

10. The UE of claim 1, wherein the UE reports an indication of a maximum supported buffer size.

11. A method comprising:

receiving, by a user equipment (UE), a first physical downlink control channel (PDCCH) signal and a second PDCCH signal from a base station, the second PDCCH signal being a repetition of the first PDCCH signal and sent via a different beam from the base station than that of the first PDCCH signal, the first PDCCH signal and the second PDCCH signal sharing a same control channel element (CCE) aggregation level and a starting candidate index, the first PDCCH signal and the second PDCCH signal configured by the base station to use two linked search space (SS) sets, wherein a maximum number of linked SS sets overlapping in a time domain are predefined or are determined based on reported UE capability;

blindly decoding the first PDCCH signal and the second PDCCH signal by obtaining respective soft-bits from the first PDCCH signal and the second PDCCH signal;

buffering, by the UE in a buffer, the respective soft-bits for a duration, wherein the buffer is incremented using one of per component carrier (CC), per bandwidth part (BWP), counted across CCs in a band, counted across CCs in a band combination, counted across CCs in a frequency range (FR), or counted per UE; and combining the respective soft-bits to jointly decode the first PDCCH signal and the second PDCCH signal.

12. The method of claim 11, wherein the one of per component carrier (CC), per bandwidth part (BWP), across CCs in a band, across CCs in a band combination, across CCs in a frequency range (FR), or per UE is selected based on an RRC parameter.

13. The method of claim 11, wherein the UE is engaged in a multi-downlink control information (DCI)-based multi-transmission-reception-point (multi-TRP) operation, and the buffer is incremented on a per TRP-control channel resource set (CORESET) associated with a same CORESETPoolIndex, or is counted across TRPs.

14. The method of claim 11, wherein one of the two linked SS sets is dropped due to one of overbooking, QCL-TypeD collision handling, overlapping of SSB, overlapping of rate matching resources, overlapping with semi-static/dynamic uplink (UL) symbols or a physical random access channel (PRACH).

15. The method of claim 11, wherein the buffer is incremented based on all linked PDCCH candidates, or the buffer is incremented based on a maximum total number of resource elements (REs) for each CCE aggregation level.

16. The method of claim 11, wherein a priority rule for incrementing the buffer is based on a type of SS, a serving cell index, an ID of a SS set, or an ID of a control channel resource set (CORESET).

17. The method of claim 11, further comprising dropping at least one low-priority SS set pairs to accommodate a maximum supported buffer size.

18. The method of claim 11, further comprising selectively decoding at least one low-priority SS set pair to accommodate a maximum supported buffer size.

19. The method of claim 11, further comprising dropping or selectively decoding at least one low-priority SS set pair based on a reported capability of the UE or based on a configuration transmitted by the base station.

20. A base station comprising:

a radio frequency (RF) transceiver configured to receive an indication of a maximum supported buffer size of a user equipment (UE);

processing circuitry, coupled to the RF transceiver, configured to generate a first physical downlink control channel (PDCCH) signal and a second PDCCH signal, the second PDCCH signal being a repetition of the first PDCCH signal, the first PDCCH signal and the second PDCCH signal sharing a same control channel element (CCE) aggregation level and a starting candidate index, the first PDCCH signal and the second PDCCH signal configured to use two linked search space (SS) sets, wherein a maximum number of linked SS sets overlapping in a time domain are predefined or are determined based on reported UE capability;

the processing circuitry further configured to adjust scheduling of the first PDCCH signal or the second PDCCH signal, or to adjust priorities of the two linked SS sets based on the indication of the maximum supported buffer size;

the RF transceiver further configured to transmit the first PDCCH signal and the second PDCCH signal to the UE; and an RRC parameter, wherein the RRC parameter causes the UE to increment a buffer using one of per component carrier (CC), per bandwidth part (BWP), count across CCs in a band, count across CCs in a band combination, count across CCs in a frequency range (FR), or count per UE.

* * * * *